(12) United States Patent
Zhu et al.

(10) Patent No.: US 12,518,895 B2
(45) Date of Patent: Jan. 6, 2026

(54) INSULATED WIRE AND PREPARATION METHOD THEREOF, COIL AND ELECTRONIC/ELECTRICAL DEVICE

(71) Applicant: WELL ASCENT ELECTRONIC (GANZHOU) CO., LTD., Jiangxi (CN)

(72) Inventors: Yuejia Zhu, Jiangxi (CN); Zuomao Zhu, Jiangxi (CN); Huimin Ye, Jiangxi (CN)

(73) Assignee: WELL ASCENT ELECTRONIC (GANZHOU) CO., LTD., Jiangxi (CN)

( * ) Notice: Subject to any disclaimer, the term of this patent is extended or adjusted under 35 U.S.C. 154(b) by 0 days.

(21) Appl. No.: 19/005,928

(22) Filed: Dec. 30, 2024

(65) Prior Publication Data
US 2026/0004955 A1    Jan. 1, 2026

(30) Foreign Application Priority Data
Jun. 28, 2024   (CN) .......................... 202410858408.6

(51) Int. Cl.
| | | |
|---|---|---|
| *H01B 13/14* | (2006.01) | |
| *H01B 3/36* | (2006.01) | |
| *H01B 7/02* | (2006.01) | |

(52) U.S. Cl.
CPC ............... *H01B 13/14* (2013.01); *H01B 3/36* (2013.01); *H01B 7/02* (2013.01)

(58) Field of Classification Search
CPC .............. H01B 13/14; H01B 3/36; H01B 7/02
USPC ........................................................... 428/375
See application file for complete search history.

(56) References Cited

U.S. PATENT DOCUMENTS

| | | | |
|---|---|---|---|
| 10,174,198 B2* | 1/2019 | Jolley | ..................... C08L 75/02 |
| 2011/0212334 A1 | 9/2011 | Jolley et al. | |
| 2013/0345102 A1* | 12/2013 | Yamaguchi | .......... C07D 307/89 |
| | | | 508/288 |

FOREIGN PATENT DOCUMENTS

| | | |
|---|---|---|
| CN | 108346765 A | 7/2018 |
| CN | 114334289 A | 4/2022 |
| CN | 116285655 A | 6/2023 |
| CN | 116622069 A | 8/2023 |
| CN | 117447960 A | 1/2024 |

OTHER PUBLICATIONS

Chinese First Office Action dated Jul. 31, 2024 issued in CN 202410858408.6.
Notice of Grant dated Aug. 12, 2024 issued in CN 202410858408.6.

* cited by examiner

*Primary Examiner* — Vincent Tatesure
(74) *Attorney, Agent, or Firm* — Scully, Scott, Murphy & Presser, P.C.

(57) ABSTRACT

An insulated wire and a preparation method thereof, a coil, and an electronic/electrical device are provided. The insulated wire includes a conductor and a bonding layer, and a PEEK resin sequentially arranged on the outer side of the conductor. The structure of the bonding layer includes a polymerization unit and a polymerization unit, and the polymerization unit accounts for 5-15%.

5 Claims, No Drawings

INSULATED WIRE AND PREPARATION METHOD THEREOF, COIL AND ELECTRONIC/ELECTRICAL DEVICE

TECHNICAL FIELD

The present disclosure relates to the technical field of insulated wires, in particular to an insulated wire and a preparation method thereof, a coil and an electronic/electrical device.

BACKGROUND

With the rapid development of new energy electric vehicles, higher application requirements are put forward for the motor efficiency, power and reliability of electric vehicles, therefore, electromagnetic wires for 800 V high-voltage drive motors are imperative. Use of such high-voltage motor electromagnetic wire requires the effective value of the partial discharge initiation voltage (PDIV) to increase to 1400 V or more, however an ordinary polyimide enameled electromagnetic wire is far from meeting such requirement.

Polyether-ether-ketone (PEEK) is a resin excellent in electrical insulating performance, with a volume resistivity of about $10^{15}$-$10^{16}$ $\Omega \cdot cm$, and a low small dielectric constant and a small dielectric loss in a high frequency range, for example, the dielectric constant at the room temperature at $10^4$ Hz is 3.2, and the dielectric loss is only 0.02. Meanwhile, such PEEK resin has excellent heat resistance and mechanical performance as well as excellent chemical stability and outstanding hot water resistance and vapor resistance, and can be used for a long time in vapor of 200-250 DEG C. Therefore, the PEEK resin is considered an ideal enameling material for manufacturing electromagnetic wires for 800 V high-voltage motors.

The PEEK resin is too good in chemical solvent resistance, and is insoluble in general organic solvents. So it cannot be prepared into a coating to coat electromagnetic wires, and can only coat the electromagnetic wires through high temperature melt extrusion. However, due to the large melt viscosity and high cooling rate of the PEEK resin, the coating of the PEEK resin and the copper surface of an electromagnetic wire are not firmly bonded, and there is often the risk of delamination and fracture.

In the prior art, although some arts disclose that a bonding layer is arranged between a conductor and a PEEK resin, the risk of delamination and fracture of the PEEK resin is reduced to a certain extent.

For example, the patent with the publication No. CN116622069A discloses a polydiether ether imide binding agent and a preparation method and application thereof. The preparation method includes: mixing a diamine monomer with a dimethylacetamide solvent so as to obtain a diamine monomer solution; adding a dianhydride monomer into the diamine monomer solution, and under a nitrogen protected atmosphere, enabling to react for a first preset time at a first preset temperature so as to obtain a polydietheretheramide acid solution; adding an adjuvant into the polydietheretheramide acid solution, and continuously adding the dimethylacetamide solvent so as to obtain a polydietheretheramide acid finished product; and coating a copper wire with the polydietheretheramide acid finished product, heating for a second preset time at a second present temperature, and after heating is completed, enabling to react for a third preset time at a third preset temperature, thereby forming the polydiether ether imide binding agent on the surface of the copper wire. In the patent, although the bonding performance with a PEEK resin can be improved, the bonding performance with the conductor is yet to be improved.

How to further improve the performance overall, especially to improve the bonding performance with the lead, while ensuring the electrical performance of an insulated wire, so that the insulated wire has better stability and safety needs to be solved urgently.

SUMMARY

In view of this, the main purpose of the present invention is to provide an insulated wire. According to the insulated wire provided by the present invention, not only is the bonding layer therein excellent in bonding performance with a polyetheretherketone resin, but also the bonding performance with a conductor is impressively improved, and the operational safety and stability of the insulated wire can be improved.

In order to achieve the above purpose, the technical solution adopted by the present invention is:

An insulated wire comprising a conductor as well as a bonding layer and a PEEK resin sequentially arranged on the outer side of the conductor;

the structure of the bonding layer comprises a polymerization unit as shown in the formula 5 below and a polymerization unit as shown in the formula 6 below, and the polymerization unit shown in formula 5 accounts for 5-15%;

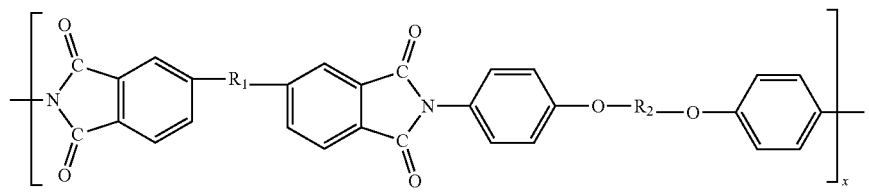

Formula 6

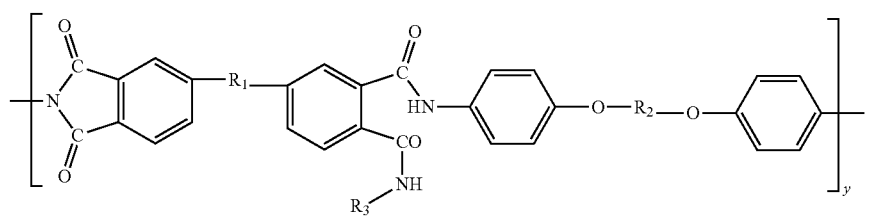

Formula 5 in the formula, x+y is 10-10000; $R_1$ and $R_2$ are both aryl; and $R_3$ is $C_{2-12}$ alkyl.

Preferably, $R_1$ is —O—$R_2$—O—, that is, $R_1$ contains ether bonds, thus further increasing diether bonds in the structure, and improving the adsorption bonding performance with the PEEK resin.

Meanwhile, by introducing the structure in the formula 5, the number of amino groups in the bonding layer in the insulated wire can be increased, and meanwhile the content of carboxyl groups therein is reduced, so that the bonding performance with metals is improved, corrosion to metals is reduced, and the electrical breakdown resistance of a product is improved.

The second purpose of the present invention is to provide a preparation method of the insulated wire, including the following steps:

1) preparing a diamine monomer solution and an amine monomer solution mixing a diamine monomer with a solvent, and under a nitrogen protected atmosphere, stirring and mixing till the diamine monomer is completely dissolved so as to obtain the diamine monomer solution;

mixing an amine monomer with a solvent, and under a nitrogen protected atmosphere, stirring and mixing till the amine monomer is dissolved or completely mixed so as to obtain the amine monomer solution, where the amine monomer structurally contains one or two amino groups, and contains 2-12 carbon atoms;

2) mixing a dianhydride monomer with the diamine monomer solution, and under a nitrogen protected atmosphere, stirring to react completely so as to obtain a polydietheretheramide acid solution;

3) mixing the polydietheretheramide acid solution with the amine monomer solution, stirring to react completely, adjusting the solid content and viscosity of the reaction liquid so as to obtain a polydietheretheramide acid finished product;

4) coating the conductor with the polydietheretheramide acid finished product, heating to 200-300 DEG C. to react, and after the reaction is completed, further heating to 345-480 DEG C. to react to form an insulated wire bonding layer on the surface of the lead after the reaction is completed so as to obtain a core wire;

5) extruding a molten PEEK resin material onto the outer surface of the bonding layer of the core wire to form a PEEK resin insulating layer, thereby obtaining the insulated wire;

the mole ratio of the dianhydride monomer to the diamine monomer is 1:(0.8-1), preferably 1:1; and the mole ratio of the dianhydride monomer to the amine monomer is 1:(0.02-0.15).

The solvent in step 1) includes a dimethylacetamide solvent.

What needs to be noted is that when the amine monomer contains two amino groups, the mole ratio of the dianhydride monomer to the amine monomer is preferably 1:(0.02-0.075); and when the amine monomer contains one amino group, the mole ratio of the dianhydride monomer to the amine monomer is preferably 1:(0.05-0.15), and more preferably 1:(0.05-0.1).

In the present invention, the dianhydride monomer is as shown in the formula 1 below, in the formula, $R_1$ is aryl, and preferably aryl with ether bonds.

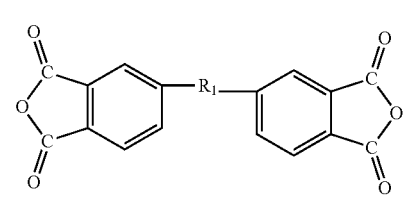

Formula 1 the diamine monomer is as shown in the formula 2 below, in the formula, $R_2$ is aryl;

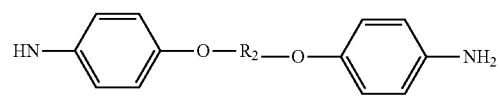

Formula 2 the amine monomer is as shown in the formula 3 below, in the formula, $R_3$ is $C_{2-12}$ alkyl, and n is 1 or 2;

Formula 3 in step 3), the polydietheretheramide acid finished product obtained through the reaction contains a polymerization unit as shown in formula 4 below, and the ratio of the polymerization unit is in accordance with that of the amine monomers.

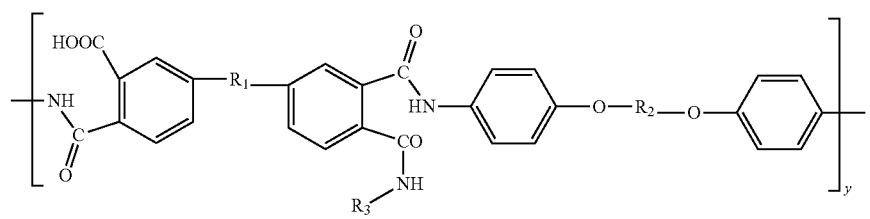

Formula 4 in step 4), the bonding layer of the insulated wire obtained contains a polymerization unit as shown in the formula 5 below and a polymerization unit as shown in the formula 6 below, in the formula, the polymerization unit shown in formula 5 accounts for 5-15%;

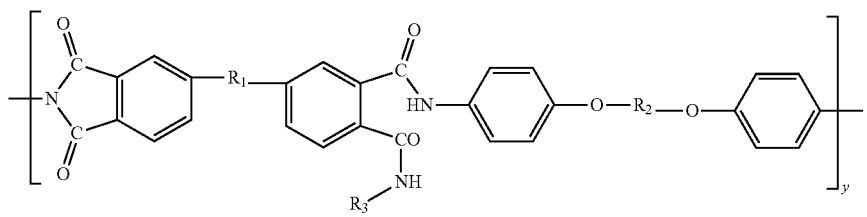

Formula 5

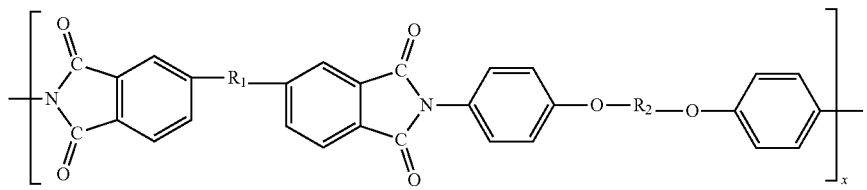

Formula 6

In the preparation method provided by the present invention, by introducing the amine monomer solution with amino groups in step 3) to react with carboxyl groups in polydietheretheramide acid to generate a structure shown in formula 4, and after the treatment in step 4), the structure shown in formula 5 is formed in the bonding layer obtained. After introducing the amine monomer solution with amino groups in the present invention, the number of amino groups in the finished product can be increased, and meanwhile the content of carboxyl groups therein is reduced, so that the bonding performance with metals can be improved, corrosion to metals can be reduced, and the electrical breakdown resistance of a product can be improved.

Further, the diamine monomer includes one or more of 4,4'-bis(4"-amino phenoxy) diphenyl ketone, 2,2-bis[4'-(4"-amino phenoxy) phenyl] propane, 1,3-bis(4'-amino phenoxy)benzene and 1,4-bis(4'-amino phenoxy)benzene.

Further, the amine monomer includes one or more of ethylamine, propylamine, butylamine, aniline, naphthylamine and benzidine.

Further, the dianhydride monomer includes one or more of bisphenol A dianhydride, 3,3',4,4'-diphenyl ether dianhydride and 3,3',4,4'-triphenyl diether tetracarboxylic dianhydride.

Further, in step 1), mixing the diamine monomer with the dimethylacetamide solvent, the mole ratio of the diamine monomer to the dimethylacetamide solvent is 1:(10-30), the stirring and mixing time is 1-2 h, and the mixing temperature is minus 5-5 DEG C.;

in the step of mixing the amine monomer with the dimethylacetamide solvent, the mole ratio of the amine monomer to the dimethylacetamide solvent is 1:(10-30), the stirring and mixing time is 0.5-2 h, and the mixing temperature is minus 5-5 DEG C.

Further, in step 2), the time of stirring to react is 10-12 h, and the reaction temperature is minus 5-5 DEG C.

Further, in step 3), the time of stirring to react is 2-3 h, and the reaction temperature is minus 5-5 DEG C.;

the adjusting the solid content and viscosity of the reaction liquid is specifically adjusting the solid content of the reaction liquid to be greater than 21% by adding an adjuvant and the dimethylacetamide solvent; the adjuvant includes a leveling agent, a defoaming agent, a diluent and a toughening agent; the leveling agent is a common adjuvant which promotes a coating liquid (that is, the polydietheretheramide acid finished product) to form a flat, smooth and uniform coating film in the drying and filming process, thus effectively reducing the surface tension of the coating liquid, improving the leveling performance and uniformity thereof, specifically as butyl cellulose, polyacrylic acid, carboxymethyl cellulose, and the like; the defoaming agent is an additive for removing foams, including polydimethylsiloxane, mineral oil, and the like; the diluent includes methyl methacrylate, acetone, and the like; and the toughening agent includes polyether urethane, butadiene styrene rubber, and the like.

Further, in step 4), the reaction time of heating to 200-300 DEG C. is 5-35 min; and the reaction time of heating to 345-480 DEG C. is 10-45 s.

The third purpose of the present invention is to provide a coil, including the insulated wire or the insulated wire prepared by using any of the preparation methods.

The purpose of the present invention is also to provide an electrical or electronic device manufactured using the coil.

Compared with the prior art, the present invention has the following advantages:

The insulated wire provided by the present invention is good in bonding performance, and good in bonding performance between metallic conductors and bonding layers, meanwhile, corrosion to metals is reduced, the electrical breakdown resistance of a product is improved, and the operational safety and stability of the insulated wire is improved.

DETAILED DESCRIPTION OF EMBODIMENTS

A number of specific details are set forth in the description below to provide a thorough understanding for the present invention. However, the present invention may also be implemented in other manners different from those described herein, and those skilled in the art may make similar modification without departing from the essence of the present invention, therefore, the present invention is not limited by the specific embodiments disclosed below.

Unless otherwise stated, all technical and scientific terms used in the embodiments of the present invention have the same meaning as those commonly understood by those skilled in the technical field of the present invention. The terms used in the present invention are only for the purpose of describing the specific embodiments and are not intended to limit the scope of the present invention.

Embodiment 1

A preparation of an insulated wire is provided, including the following steps:
1) preparing a diamine monomer solution and an amine monomer solution Under a nitrogen protected atmosphere, mixing 0.1 mol of a diamine monomer 4,4'-bis(4"-amino phenoxy) diphenyl ketone with 2 mol of a dimethylacetamide solvent, and stirring and mixing at 0 DEG C. for 2 h till the diamine monomer is completely dissolved so as to obtain the diamine monomer solution;

under a nitrogen protected atmosphere, mixing 0.01 mol of an amine monomer aniline with 0.2 mol of the dimethylacetamide solvent, and stirring and mixing at 0 DEG C. for 0.5 h till aniline is completely mixed with the dimethylacetamide solvent so as to obtain the amine monomer solution;

2) under a nitrogen protected atmosphere, mixing 0.1 mol of a dianhydride monomer 3,3',4,4'-diphenyl ether dianhydride with the diamine monomer solution, and stirring and mixing at 0 DEG C. for 12 h so as to obtain a polydietheretheramide acid solution;

3) mixing the polydietheretheramide acid solution with the amine monomer solution, stirring to react at 0 DEG C. for 2.5 h, adding a leveling agent, a defoaming agent, a diluent and a toughening agent, stirring and mixing uniformly, adjusting to the room temperature, and continuously adding the dimethylacetamide solvent to adjust the solid content of the reaction liquid to be greater than 21% so as to obtain a polydietheretheramide acid finished product;

4) coating a lead with the polydietheretheramide acid finished product obtained, heating to 280 DEG C. to react for 20 min, and after the reaction is completed, further heating to 450 DEG C. to react for 35 s to form an insulated wire bonding layer of 20 μm in thickness on the surface of the lead after the reaction is completed so as to obtain a core wire;

5) extruding a molten PEEK resin material onto the outer surface of the bonding layer of the core wire to form a PEEK resin insulating layer, thereby obtaining the insulated wire.

The size of the lead is 1.5 mm×3.0 mm, the thickness of the bonding layer is 20 μm, and the thickness of the PEEK resin insulating layer is 160 μm.

Embodiment 2

The only difference between the embodiment and Embodiment 1 is that:
in step 1), the diamine monomer used is 1,3-bis(4'-amino phenoxy)benzene, and the amine monomer used is n-propylamine;
in step 2), the dianhydride monomer used is bisphenol A dianhydride;
in step 3), mixing the polydietheretheramide acid solution with the amine monomer solution, and stirring to react at 2 DEG C. for 3 h.

Embodiment 3

The only difference between the embodiment and Embodiment 1 is that:
in step 1), the amine monomer used is ethylamine, and the mixing time of ethylamine with the dimethylacetamide solvent is 0.2 h;
in step 2), the dianhydride monomer is 3,3',4,4'-triphenyl diether tetracarboxylic dianhydride;
in step 3), mixing the polydietheretheramide acid solution with the amine monomer solution, and stirring to react at 5 DEG C. for 2 h.

Embodiment 4

The only difference between the embodiment and Embodiment 1 is that:
in step 1), the diamine monomer used is 2,2-bis[4'-(4"-amino phenoxy) phenyl] propane, and the amine monomer used is 1-naphthylamine; mixing 1-naphthylamine with the methylacetamide solvent, and stirring and mixing at 0 DEG C. for 1.5 h;
in step 2), the dianhydride monomer used is bisphenol A dianhydride;
in step 3), mixing the polydietheretheramide acid solution with the amine monomer solution, and stirring to react at 5 DEG C. for 3 h.

Embodiment 5

The only difference between the embodiment and Embodiment 1 is that:
in step 1), the diamine monomer used is 1,4-bis(4'-amino phenoxy)benzene, and the stirring and mixing time of 1,4-bis(4'-amino phenoxy)benzene with the dimethylacetamide solvent is 1.5 h;
the amine monomer is 4,4'-diphenylenediamine, and the content of 4,4'-diphenylenediamine is 0.005 mol;
in step 2), the dianhydride monomer is 3,3',4,4'-triphenyl diether tetracarboxylic dianhydride;
in step 3), mixing the polydietheretheramide acid solution with the amine monomer solution, and stirring to react at 0 DEG C. for 3 h.

Comparative Embodiment 1

The only difference between the embodiment and Embodiment 1 is that:
in step 1), the content of aniline is 0.03 mol, that is, in the embodiment, the mole ratio of the dianhydride monomer to the amine monomer is 1:0.3.

Comparative Embodiment 2

The only difference between the embodiment and Embodiment 1 is that:
in step 1), the content of aniline is 0.003 mol, that is, in the embodiment, the mole ratio of the dianhydride monomer to the amine monomer is 1:0.03.

Comparative Embodiment 3

The only difference between the embodiment and Embodiment 1 is that:
in step 3), no amine monomer solution is added, but directly adding the leveling agent, the defoaming agent, the diluent and the toughening agent into the polydietheretheramide acid solution obtained in step 2) instead, stirring and mixing, adjusting to the room temperature, and continuously adding the dimethylacetamide solvent to adjust the solid content of the reaction liquid to be greater than 21% so as to obtain the polydietheretheramide acid finished product.

The insulated wires prepared in the embodiments 1-5 and Comparative Embodiment 1-3 are subjected to the following tests:

Adhesion test: taking an insulated wire of 300 mm long as a test sample, bending the test sample around a polished test shaft for 180±2°, then tensioning and straightening, and cutting for one circle till the conductor in the middle of the measuring length, and after tensioning for 20%, checking whether the test sample loses the adhesion. One test sample is tested, if the adhesion is lost, record in a report, and from the cutting point, the length of losing the adhesion is tested in one way. The evaluation criteria are as follows:

A+: less than 2.0 mm;
A: greater than 2.0 mm and less than 3 mm
B: greater than 3 mm and less than 4 mm;
C: greater than 4 mm.

PDIV test: PDIV test (partial discharge initiation voltage): taking two wire samples of about 300 mm, removing 10-15 mm of the insulating layer from one end of each wire sample, carrying out model forming, at about 150 mm of a straight line part, tightly winding the insulated wire back to back with a PI adhesive tape, applying a sinusoidal voltage between two conductors of the test sample under conditions specified below, and testing and recording the test value. Test conditions: 50V/S 50 HZ 100PC. The evaluation criteria are as follows:

A+: greater than 1450 V;
A: greater than 1250 V and less than 1450 V;
B: greater than 1000 V and less than 1250 V;
C: less than 1000V.

Electrical breakdown voltage: cutting a section of wire sample of about 500 mm, bending the wire sample of 500 mm for 180 degrees around a mandril of Ø25 mm, and putting in a steel ball of 2 mm; recording the value of the breakdown voltage, and observing whether there is cracking near the breakdown point.

A+: greater than 12000 V;
A: greater than 11000 V and less than 12000 V;
B: greater than 10000 V and less than 11000 V;
C: less than 10000 V.

Test results are shown in the Table 1 below:

Test results show that the bonding layer provided by the present invention is capable of effectively improving the adhesion of the insulating layer, particularly improving the bonding performance of the bonding layer with a metallic lead, and meanwhile, is good in PDIV performance and softening breakdown resistance, so that the stability and security of the insulated wire are effectively improved, and the service life of a wire material is prolonged.

Various technical features of the above embodiments can be arbitrarily combined. For brevity of description, all possible combinations of various technical features in the above embodiments are not described. However, as long as there is no contradiction between the combinations of these technical features, they should all be considered as a scope recited in this specification.

The above embodiments merely represent implementations of the present invention and are described in a more specific and detailed manner, but should not be understood to limit the patent scope of the present invention. It should be noted that several variations and improvements may also be made without departing from the concept of the present invention to those of ordinary skill in the art, and these variations and improvements should all fall within the protection scope of the present invention. Therefore, the protection scope of the present invention shall be subject to the appended claims.

What is claimed is:

1. A preparation method of an insulated wire, the insulated wire comprising a conductor as well as a bonding layer and a PEEK resin sequentially arranged on the outer side of the conductor, comprising the following steps:

1) preparing a diamine monomer solution and an amine monomer solution mixing diamine monomer with a solvent, and under a nitrogen protected atmosphere, stirring and mixing till the diamine monomer is completely dissolved so as to obtain the diamine monomer solution;

mixing an amine monomer with a solvent, and under a nitrogen protected atmosphere, stirring and mixing till the amine monomer is dissolved or completely mixed so as to obtain the amine monomer solution, wherein

TABLE 1 performance test results of the insulated wire

| Item | Thickness of bonding layer (μm) | Adhesion test Separation length of bonding layer and PEEK (mm) | Separation length of bonding layer and lead (mm) | Result | PDIV | Electrical Breakdown voltage |
| --- | --- | --- | --- | --- | --- | --- |
| Embodiment 1 | 20 | 1.55 | 0.29 | A+ | A+ | A+ |
| Embodiment 2 | 20 | 2.64 | 0.64 | A | A | A |
| Embodiment 3 | 20 | 2.72 | 0.70 | A | A | A |
| Embodiment 4 | 20 | 1.37 | 0.23 | A+ | A+ | A+ |
| Embodiment 5 | 20 | 1.44 | 0.24 | A+ | A+ | A+ |
| Comparative Example 1 | 20 | 3.69 | 0.35 | B | C | B |
| Comparative Embodiment 2 | 20 | 3.01 | 1.89 | B | A+ | A |
| Comparative Embodiment 3 | 20 | 3.38 | 2.16 | B | A+ | A | the amine monomer structurally contains one or two amino groups, and contains 2-12 carbon atoms;

2) Mixing a dianhydride monomer with the diamine monomer solution, under a nitrogen protected atmosphere, stirring to react completely so as to obtain a polydietheretheramide acid solution;

3) Mixing the polydietheretheramide acid solution with the amine monomer solution, stirring to react completely, adjusting the solid content and viscosity of the reaction liquid so as to obtain a polydietheretheramide acid finished product;

4) Coating the conductor with the polydietheretheramide acid finished product, heating to 200-300 DEG C. to react, and after the reaction is completed, further heating to 345-480 DEG C. to react, and after the reaction is completed, coating the surface of a lead to form an insulated wire bonding layer so as to obtain a core wire;

5) Extruding a molten PEEK resin material onto the outer surface of the bonding layer of the core wire to form a PEEK resin insulating layer, thereby obtaining the insulated wire;

wherein the mole ratio of the dianhydride monomer to the diamine monomer is 1:(0.8-1);

wherein the amine monomer comprises one or more of ethylamine, propylamine, butylamine, aniline, naphthylamine and benzidine;

when the amine monomer contains two amino groups, the mole ratio of the dianhydride monomer to the amine monomer is 1:(0.02-0.075); and when the amine monomer contains one amino group, the mole ratio of the dianhydride monomer to the amine monomer is 1:(0.05-0.15);

wherein the diamine monomer comprises one or more of 4,4'-bis(4"-amino phenoxy) diphenyl ketone, 2,2-bis[4'-(4"-amino phenoxy) phenyl] propane, 1,3-bis(4'-amino phenoxy) benzene and 1,4-bis(4'-amino phenoxy) benzene; and wherein the dianhydride monomer comprises one or more of bisphenol A dianhydride, 3,3',4,4'-diphenyl ether dianhydride and 3,3',4,4'-triphenyl diether tetracarboxylic dianhydride.

2. The preparation method of the insulated wire according to claim 1, wherein in step 1), mixing the diamine monomer with the solvent, the mole ratio of the diamine monomer to the solvent is 1:(10-30), the stirring and mixing time is 1-2 h, and the mixing temperature is minus 5-5 DEG C.;

in the step of mixing the amine monomer with a dimethylacetamide solvent, the mole ratio of the amine monomer to the solvent is 1:(10-30), the stirring and mixing time is 0.5-2 h, and the mixing temperature is minus 5-5 DEG C.;

wherein in step 1), the solvent comprises dimethylacetamide.

3. The preparation method of the insulated wire according to claim 1, wherein in step 2), the time of stirring to react is 10-12 h, and the reaction temperature is minus 5-5 DEG C.

4. The preparation method of the insulated wire according to claim 1, wherein in step 3), the time of stirring to react is 2-3 h, and the reaction temperature is minus 5-5 DEG C.;

adjusting the solid content and viscosity of the reaction liquid is specifically adjusting the solid content of the reaction liquid to be greater than 21% by adding an adjuvant and a solvent; the adjuvant comprises a leveling agent, a defoaming agent, a diluent and a toughening agent; and the solvent comprises dimethylacetamide.

5. The preparation method of the insulated wire according to claim 1, wherein in step 4), the reaction time of heating to 200-300 DEG C. is 5-35 min; and the reaction time of heating to 345-480 DEG C. is 10-45 s.

\* \* \* \* \*